US006009416A

United States Patent [19]

Pintsov

[11] Patent Number: 6,009,416

[45] Date of Patent: Dec. 28, 1999

[54] SYSTEM AND METHOD FOR DETECTION OF ERRORS IN ACCOUNTING FOR POSTAL CHARGES IN CONTROLLED ACCEPTANCE ENVIRONMENT

[75] Inventor: Leon A. Pintsov, West Hartford, Conn.

[73] Assignee: Pitney Bowes Inc., Stamford, Conn.

[21] Appl. No.: 09/052,418

[22] Filed: Mar. 31, 1998

[51] Int. Cl.[6] .................................................. G06F 17/00

[52] U.S. Cl. .................... 705/410; 705/406; 364/478.15; 380/23

[58] Field of Search ............................... 705/1, 401, 406, 705/410; 380/23, 25; 364/478.01, 478.07, 478.08, 478.09, 478.11, 478.12, 478.13, 478.14, 478.15

[56] References Cited

U.S. PATENT DOCUMENTS

| | | | |
|---|---|---|---|
| 4,757,537 | 7/1988 | Edelmann et al. | 380/51 |
| 4,775,246 | 10/1988 | Edelmann et al. | 380/23 |
| 4,780,828 | 10/1988 | Whisker | 364/464.02 |
| 4,831,555 | 5/1989 | Sansone et al. | 364/519 |
| 4,837,701 | 6/1989 | Sansone et al. | 364/464.03 |
| 4,853,864 | 8/1989 | Hart et al. | 364/464.02 |
| 4,907,161 | 3/1990 | Sansone et al. | 364/464.02 |
| 5,448,641 | 9/1995 | Pintsov et al. | 380/51 |
| 5,612,889 | 3/1997 | Pintsov et al. | 364/478.14 |
| 5,646,997 | 7/1997 | Barton et al. | 380/23 |
| 5,675,650 | 10/1997 | Cordery et al. | 380/23 |
| 5,684,706 | 11/1997 | Harmon et al. | 705/406 |

*Primary Examiner*—Emanuel Todd Voeltz
*Assistant Examiner*—Thomas A. Dixon
*Attorney, Agent, or Firm*—Charles R. Malandra, Jr.; Michael E. Melton

[57] ABSTRACT

A mail generation system and method includes means for processing data to generate mail piece information and first secure processing means for securely storing and encrypting mail piece information generated by the data processing means. Means are coupled to the data processing means for physically preparing mail pieces related to the generated mail piece information and for generating information related to the physical preparation of the mail. Second secure processing means securely store and encrypted information generated by the mail preparing means. Means sort the mail pieces and generate information related to the sorting and packaging of the mail pieces. Third secure processing means securely store and encrypt information generated by the mail sorting and packaging means. A part of the software program used to generate the mail piece information can be securely stored. Mail piece information to verify that the software program was employed to generate the mail piece information is encrypted.

8 Claims, 7 Drawing Sheets

FIG. 4

404 406 408 410 412 414

| | | | | | |
|---|---|---|---|---|---|
| MAILED BY (ENTITY NAME) PITNEY BOWES | ADDRESS AND TELEPHONE 35 WATERVIEW DR, SHELTON CT 203-9243500 | ACCOUNT # 987655443221 | FINANCIAL ACCOUNT # 099-34567789983 422 | STATEMENT SERIAL # 00000234 424 | DATE FEBRUARY 15, 1998 426 |
| 416 MAILED ON BEHALF (ENTITY NAME) | STAD ID 76598234124 | METHOD OF PAYMENT EFT | CONTRACT # 23456778890 | CONTAINER TYPE TRAY 428 | CONTAINER WEIGHT |
| | 418 | 420 | NUMBER OF CONTAINERS | 2 TRAYS | 10 oz |
| 430 PRODUCT DESCRIPTION | WEIGHT PER PIECE | RATE PER PIECE | NUMBER OF PIECES | COMBINED WEIGHT | COMBINED POSTAGE |
| 432 3/5 PRESORT PREBARCODED | 0.75 oz 440 | $0.24 442 | 500 444 | 375 oz 446 | $120 448 |
| 3/5 PRESORT PREBARCODED | 1.8 oz | $0.50 | 100 | 180 oz | $50 |
| PREBARCODED | 0.75 oz | $0.26 | 50 | 37.5 oz | $13 |
| 434 RESIDUAL (FULL RATE) | 1.8 oz | $0.32 | 10 | 18 oz | $3.2 |
| 436 TOTALS | | 452 | 660 | 610 oz | $186.2 |
| 438 STATEMENT | OF DISCOUNTS | SERIAL # 00000179 | | | |
| 450 3 DIGIT GROUP ZIP CODE | 5 DIGIT ZIP (SUBGROUP 1) | 5 DIGIT ZIP (SUBGROUP 2) | 5 DIGIT ZIP (SUBGROUP n) | TRAYS IN THE GROUP | |
| 454 068 | 06848 | 06850 | 06871 | 1 | |
| 300 | 456 150 | 458 100 | 460 50 | | NUMBER OF PIECES IN THE GROUP |
| 3 DIGIT GROUP ZIP CODE | 5 DIGIT ZIP (SUBGROUP 1) | 5 DIGIT ZIP (SUBGROUP 2) | 5 DIGIT ZIP (SUBGROUP n) | TRAYS IN THE GROUP | |
| 462 061 | 06107 | 06117 | 06140 | 1 | |
| 360 | 200 | 100 | 60 | | NUMBER OF PIECES IN THE GROUP |
| # OF MAIL PIECES PREBARCODED TO 11 DIGIT | # OF MAIL PIECES PREBARCODED TO 9 DIGIT | # OF MAIL PIECES PREBARCODED TO 5 DIGIT | NUMBER OF MAILPIECES WITHOUT BARCODE 470 | | |
| 464 590 | 40 | 20 | 10 | | |
| DIGITAL SIGNATURE 0847&•*((%S# 2311Ø4)77254 | MAILERS PUBLIC KEY CERTIFICATE 45%M&•&•S## 898765418%^ | TOTAL NUMBER OF PIECES IN THE STATEMENT OF DISCOUNTS | 660 468 | TOTAL WEIGHT OF MAILING | 630 oz |

472 466 474 476 478 402

SYSTEM AND METHOD FOR DETECTION OF ERRORS IN ACCOUNTING FOR POSTAL CHARGES IN CONTROLLED ACCEPTANCE ENVIRONMENT

FIELD OF THE INVENTION

The present invention pertains to mail payment and evidencing systems and, more particularly, to a mail payment and evidencing system which is adapted to be employed with a batch of mail prepared by a mailer and processed by a carrier as part of the mail distribution process.

BACKGROUND OF THE INVENTION

Various methods have been developed for payment of carrier services. These payment methods include postage stamps which are individually applied to each mailpiece and metered imprints which are also individually applied to each mailpiece. Additionally, other systems have been developed such as permit mail where a carrier issues a permit allowing certain types of mailing and manifest systems wherein mail is manifested and delivered to a carrier service along with the manifest.

In a mail production environment, where large batches of mail are produced, each of the above payment methods involves compromises between ease of use and security for the payment of postage to the carrier service. Stamped mail requires costly printing of stamps by the carrier service, as well as costly control and revenue accounting for the stamps. Moreover, the utilization of stamps as a payment method provides little information to the carrier service related to the cost associated with operating any particular facility or any particular class of mail delivery service provided. Additionally, the utilization of stamps particularly in a large mail production environment, does not easily accommodate multiple rate mailings. Mechanical dispensing of stamps is slow and prone to malfunction. The labor and time involved in purchasing of stamps by the mailer is costly, and security is limited due to theft, of stamps and reused or "washing" of stamps.

Traditional metered mail provides a significant level of security for the carrier service. However, in high volume production mail environment variable weight mailings may require multiple meters to achieve high throughput speeds and mechanical malfunctions may frequently occur for high volumes of mail printed by meters with mechanical printing mechanisms.

Many of these problems have been alleviated with the advent of new electronic postage meters, particularly postage meters which are adapted to print with digital printing technologies. Enhanced security has been obtained with postage meters with digital printing through the use of encrypted indicias. The encrypted indicias employ a digital token which is encrypted data that authenticates the value and other information imprinted on the mailpiece. Examples of systems for generating and using digital tokens are described in U.S. Pat. No. 4,757,537 for SYSTEM FOR DETECTING UNACCOUNTED FOR PRINTING IN A VALUE PRINTING SYSTEM; U.S. Pat. No. 4,831,555 for UNSECURED POSTAGE APPLYING SYSTEM; and, U.S. Pat. No. 4,775,246 for SYSTEM FOR DETECTING UNACCOUNTED FOR PRINTING IN A VALUE PRINTING SYSTEM. Because the digital token incorporates encrypted data including postage value, altering of the printed postage revenue and the postage revenue block is detectable by an appropriate verification procedure. Moreover, systems have been proposed for postal payment with verifiable integrity to detect attempts to interfere with the rating process for the postage amount to be imprinted as opposed to interference with the resulting printed postage value. In this connection, reference is made to U.S. Pat. No. 5,448,641 for POSTAL RATING SYSTEM WITH A VERIFIABLE INTEGRITY.

Both permit mail and manifest mail systems, as well as related contract mail systems, usually have no evidence of postage payment on individual mailpieces and require complex and extensive acceptance procedures and associated documentation. These systems are very complex, time consuming and inaccurate for the carrier service in administering and accepting mail. Moreover, the funds security of the system is vulnerable since it is open to undetectable collusion. Once permit mail has been accepted into the carrier mail delivery system, it is extremely difficult to determine whether the mail has been paid for. Furthermore, because of the various techniques used for payment adjustments, a significant loss of revenue or over payment by either the carrier or the mailer, as the case may be, is possible since payment is verified only by a sampling method. In addition, systems of this type are very complex for the mailer, are error prone and require extensive documentation. Further, the risk of overpayment by the mailer or the requirement to redo the documentation and mail due to adjustments exists in these systems. Additionally, the systems of this type involve time consuming costly acceptance procedures. Moreover, for certain of these permit payment systems, preprinted envelopes must be maintained in inventory.

An improved manifest system has been proposed, for example, as set forth in U.S. Pat. No. 4,907,161 for BATCH MAILING SYSTEM, U.S. Pat. No. 4,837,701 for MAIL PROCESSING SYSTEM WITH MULTIPLE WORK STATIONS; U.S. Pat. No. 4,853,864 for MAILING SYSTEM HAVING POSTAL FUNDS MANAGEMENT; U.S. Pat. No. 4,780,828 for MAILING SYSTEM WITH RANDOM SAMPLING OF POSTAGE; and U.S. Pat. No. 5,675,650 for CONTROLLED ACCEPTANCE MAIL PAYMENT AND EVIDENCING SYSTEM.

SUMMARY OF THE INVENTION

It is an object of the present invention to provide an improved postage payment and evidencing system.

It is a further object of the present invention to provide an effective controlled acceptance process for such mail that includes improved flexibility for the mailer in creating mail and a high level of security for payment and evidencing of appropriate carrier service.

It is yet a further objective of the present invention to employ a system for batch mail along with verification procedures in the creation and physical preparation of the mail.

A mail generation system embodying the present invention includes means for processing data to generate mail piece information and first secure processing means for securely storing and encrypting mail piece information generated by the data processing means. Means are coupled to the data processing means for physically preparing mail pieces related to the generated mail piece information and for generating information related to the physical preparation of the mail. Second secure processing means securely store and encrypted information generated by the mail preparing means. Means sort the mail pieces and generate information related to the sorting and packaging of the mail pieces. Third secure processing means securely store and encrypt information generated by the mail sorting and packaging means.

A mail generation method for embodying the present invention includes processing data to generate mail piece information and securely storing and encrypting mail piece information generated by the data processing. Mail pieces related to the generated mail piece information are physically prepared and information related to the physical preparation of the mail generated. Information generated by the mail preparing is securely stored and encrypted. Information related to the sorting and packaging of the mail pieces is generated and the information generated by the mail sorting and packaging is securely stored and encrypted.

In accordance with a feature of the invention, a method for mail generation includes processing data to generate mail piece information and securely storing a part of the software program used to generate the mail piece information. Mail piece information to verify that the software program was employed to generate the mail piece information is encrypted.

In accordance with yet another feature of the present invention, a method for mail generation includes processing data to generate mail piece information and securely storing and encrypting mail piece information generated by the data processing. Mail pieces related to the generated mail piece information are physically prepared and information related to the physical preparation of the mail is generated. Information generated by the mail preparing is securely stored and encrypted. A comparison is made of the securely stored and encrypted mail piece information generated by the data processing and the securely stored and encrypted information generated by said mail preparing means.

In accordance with still another aspect of the invention, mail may be physically inspected for consistency with the securely stored and encrypted mail piece information generated by the data processing and the securely stored and encrypted information generated by the mail preparing means.

BRIEF DESCRIPTION OF THE DRAWINGS

Reference is now made to the following Figures wherein like reference numerals designate similar elements in the various views and in which:

FIG. 4 is a secure statement of mailing including statement discounts generated by the system shown in FIG. 1.

DETAILED DESCRIPTION OF THE PREFERRED EMBODIMENT

General Background

Figure 1:
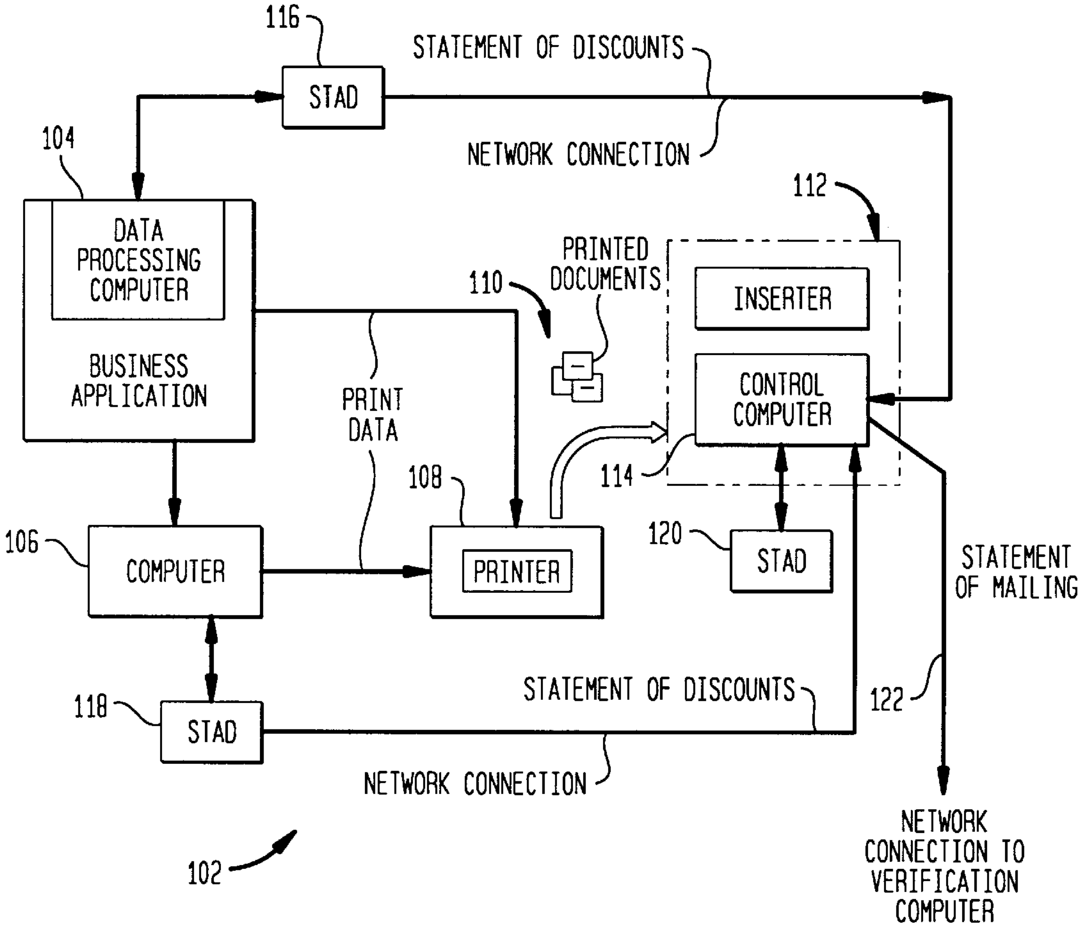
FIG. 1 is a diagrammatic depiction of a batch mail generation system employing the present invention.

Physical mail is the lifeblood of the mail communication system. The mail communication system remains the only universal means of communication between businesses and customers, e.g. households as well as between households.

Billing is a classical example of a critical business function accomplished through mail communication system. For example, a large utility company such as a telephone company produces and sends on a regular basis (typically monthly) bills to its customers. From information point of view each bill is composed of billing data (such as account number, itemized charges and totals, due date etc.) and the delivery address where the bill must be sent by mail. The billing data is a message or a document.

Production of mail by large mailers is a complex process frequently involving several stages. The delivery address (or simply address if there is no confusion with origination address) and message data are normally created, processed and maintained in a Data Processing environment where powerful main frame or mini computers process large amount of data required to generate mail. Almost all information processing functions for mail creation takes place in this environment including addresses verification, presorting, creation of the information for mail prebarcoding and generation of machine-readable codes for mail assembly machines also known as inserters. If the mail composition data (i.e. a set of parameters sufficient to compute postal rate for each mail piece) known at this stage postal charges are also computed and Statement of Mailing or manifest information is created. These are physical or electronic documents containing among other things summary of postal charges based on mail rating parameters such as weight, presort level, prebarcoding, postal zone etc. Then mailing components are printed by a high speed printing systems. These components are sheets of paper with message information, address information and machine readable assembly instructions. After the printing process, printed components are brought into mail production facilities where they are merged with other materials and assembled into finished mail pieces. During this process, postal charges may be computed by an insertion machine (if it was not possible to do so during the Data Processing stage) and imprinted on individual mail items or summarized in a Statement of Mailing or both. Typically, the postal charges computed during the mail production phase when the mail composition is not known at the time of printing of the message and the address/control code bearing documents.

All mailers which produce sizable amounts of mail wish to take advantage of worksharing discounts whenever possible. These are frequently mail charge discounts for presorting and/or prebarcoding discounts. If the number of mail pieces produced or geographical distribution of delivery addresses are not sufficient to qualify for presort discounts, mailers frequently physically merge their mailings with other mailings and presort resulting mailings on production mail sorters similar to ones used by postal operators. Alternatively, mailer may choose to bring the nonqualified portion of their mailings to a service company for merging and presorting with mailings from other companies in exchange for a portion of postal discount. Finally, mail is delivered for controlled acceptance into a postal or other facility where accuracy of the charges computed by the mailer may be verified by postal employees before mail is accepted for distribution. The verification may be of a sample of the mail. In this environment errors, intentional or accidental, are frequent. In USA the incorrectly claimed discounts may be large and even exceed hundreds of millions of dollars annually. It has been discovered, that the problem lies not with the actual physical presort or the quality of bar codes, but with the accounting for such presort or prebarcoding. The reason for this phenomenon is that mailers are not interested in submitting physically incorrectly presorted mailings because this will affect the quality and timeliness of delivery of their mail thus defeating the purpose of mail communication. However, unscrupulous mailers are very much interested in presenting incorrect accounts to maximize their discounts. The problem is aggravated by the fact that being caught with the incorrect accounting such mailers facing no risk. They are required to pay additional charges assessed by postal acceptance clerks when discovered, but they can try to present incorrectly accounted for mailings again and again. Methods proposed to solve the problem by "certifying" presort/prebarcoding software. These approaches, in principle, have severe limitations since they provide no binding link between physical mail and software used to produce such mail. The unscrupulous mailer can simply use different than "certified" software for producing actual mail or use "certified" software to processes some fictitious addresses artificially added to the real mailing list, which would never make it into actual mailing. In either case "certified" software accomplishes very little in achieving the goal of revenue protection.

In a U.S. Pat. No. 5,675,650 assigned to the same assignee as the present invention an effective mechanism for verifying the number of mail pieces accounted by a secure trusted accounting device has been already described. This mechanism enables the verification authority to find any discrepancy between the reported and accounted and the actual numbers of mail pieces in the mailing, thus enabling quick and effective detection of mail pieces which were not accounted for but present in the mailing. This is the case of the outright stealing of full postage for unreported number of mail pieces. The present case describes extension of this concept to a more subtle case of stolen postal discounts.

System Overview

It has been discovered that the accounting for presorted and/or prebarcoded pieces can be done in conjunction with address processing in a secure manner. This means that all the information required to compute postal discounts is normally available at the time of the mailing list processing and can be supplied to a secure trusted accounting device (STAD). The STAD is electronic hardware and associated software where such information is securely stored. The information in STAD can not be changed once it is entered in STAD, but can be completely erased if required. Upon completion of mailing list processing the STAD contains in its non-volatile memory (NVM) a complete record of the number mail pieces to be produced together with their respective postal codes. This information can be digitally signed and submitted in computerized form directly to the postal acceptance unit where postal computer can verify the digital signature thus making sure that the information was not changed in transit and so the postal computer would have a computerized record of exactly the same information as was submitted by mailer's address processing software to the STAD. The information file produced by STAD and communicated to the Post (verification authority) is a Statement of Mailing, which may include complete set of information regarding discounts, applied by the mailer. We call this part of the Statement of Mailing the Statement of Discounts. The Statement of Mailing is digitally signed and can be communicated to the Post together with the public key certificate signed by the Post or other certification authority. It can be also communicated in the form of digital envelope (see, for example, page 20 Book I Business Description in the publication Secure Electronic Transaction (SET) Specification published Jun. 17, 1996, by Master Card and Visa). This may be particularly advantageous since it will allow to transport the entire Statement of Mailing encrypted using a session symmetric key encrypted with the Postal authority public key. It also allows to include in the message the symmetric secret key which was used to compute digital tokens imprinted on individual mail pieces to provide secure linkage to software used for address processing. This delivers a very effective, and simple, key management system.

From the Statement of Discounts postal computer can then compute presort qualification profile, being, for example, the number of pieces that belong to 3 digit postal code level, 5 digit level etc. together with the estimated number of trays to each 3 digit level and the number of 5 digit postal code bundles in each tray labeled with the corresponding 3 digit postal code. This information can be compared during the acceptance process with the composition of physical mail presented for acceptance using an appropriate sampling procedure. Any discrepancy between the STAD records and the records obtained as a result of physical examination of mailing in the total number of pieces which is estimated based on the total weight as described in U.S. Pat. No. 5,675,650, the entire specification of which is hereby incorporated by reference, in the number of pieces that were addressed to a given postal code etc. would not only indicate fraud but present a very substantial evidence of fraud sufficient for prosecution.

One modification of the present invention allows to securely link every mail piece with its Statement of Discounts. This is done by imprinting or labeling every mail piece with an encrypted number obtained from the delivery address information for the piece, a piece unique identification number and the Statement of Mailing ID. The encrypted number (more appropriately known as the ciphertext or digital token) can be in the form of a truncated Message Authentication Code or obtained by any other appropriate cryptographic primitive which provides for source authentication and data integrity (see Handbook of Applied Cryptography, CRC Press 1997). If such a secure link is implemented it provides a mechanism for proving deliberate fraudulent activities.

A very important benefit of the present invention is the ability to provide evidence of fraud and thus generates a serious deterrence effect. Unscrupulous mailer would have a serious problem claiming an innocent processing error and would have a difficult time in trying to defraud postal authority by a similar method again. The basic method described here can be extended to a number of other alternatives such as to the mail presorted by mailers using physical sorting (not computerized sorting). In this case each physical mail sorter is equipped with STAD that keeps record of presort activities. If the final mailing to be submitted for acceptance by the Post was produced or presorted by several sorters or inserters, the aggregate Statement of Mailing including Statement of Discounts can be combined from such statements produced by individual STADs attached to each machine computer controller. This can be done by a computing device such as a PC equipped with another STAD. In this case individual statements submitted to such a PC digitally signed (or MACed). The PC verifies each signature, assures the authenticity and integrity of data, and then merges all records together and digitally signs the aggregate statement.

It should be expressly noted that in the case when mailer's Electronic Data Processing and Mail Production facilities are not co located two separate STADs can be used in conjunction with Data (Address) Processing and Mail Assembly. At the end of address processing activity the Statement of Discounts is digitally signed and can be transmitted to a computing device in mail production facility. This transmission can be done via a network such as LAN, WAN or public network such as Internet. In the latter case the Statement of Discounts can be encrypted using for example the digital envelope mode mentioned above. Alternatively, the Statement of Discounts can be physically transferred using magnetic or optical storage device such as floppy diskette or CD ROM. In either case the computing device in the mail production facility is capable of receiving and interpreting the Statement of Discounts. At the end of the mail production run, when the STAD connected to mail generation system, for example, an inserter contains all other data needed to form a Statement of Mailing the two files (Statement of Discounts and mail generation file containing weights and postage by category and other information as described below) are merged. We refer to the combined file as the Statement of Mailing. It is digitally signed and sent to the verification authority (Post) with the digital signature, signature and certificate or in the form of the digital envelope (if privacy protection is required).

The Statement of Mailing contains as a minimum all the information about mailing and its generation process needed to verify that the accounting process was performed properly and all the charges are correctly computed by the mailer's equipment. Alternatively, if as a result of the verification process verification authority determines (by taking physical measurements of the mailing and performing tests and comparing the results of such tests and measurements with the secure information in the Statement of Mailing) that accounting was not done properly, the verification authority will be in the possession of evidence of deliberate fraudulent activities on the part of the mailer. The process allows for noted above generalization when several mail assembly machines (inserters) or several Electronic Data Processing computers are involved in the preparation of the mailing.

It has been also discovered that a certain modification of STAD can provide a proof that specific software program was used to produce given mailing. This is particularly important in the case when postal authorities insist that mailers use "certified" software program for address processing, such as CASS certified software in the USA. In order to produce the evidence that a mail piece was generated using a specific software program the program and the STAD are modified in the following manner. A certain part of the software program, which must be executed for each mail piece, is implemented in firmware and stored within the non-volatile memory of the STAD. Then, when this software program processes mailing list, it must send information (address information) needed to execute the portion stored within the STAD to the STAD where information for software authentication is generated and send back to the main software program for printed inclusion in the information that will be on the mail piece. This authenticating information can be, for example, digital token computed by truncation of a MAC or it could be a digital signature. The authentication is established by the fact that this authenticating information can be generated only upon accessing a secret (hardware protected) key. Implementing address processing software this way forces the address processing computation to access STAD, which in turn then can keep accurate and trusted accounting records. The verification authority can verify the digital token using address information on the mail piece and a secret (or matching public) key shared with the STAD connected to the address processing computer in the mailer's facility and responsible for mail accounting. Thus, the presence of information such as, for example, digital token (truncated MAC) on the mail piece constitutes a proof that a specific software (organized as it is described above) was used to generate the mail piece. It should be noted that the just described methodology can be used for authentication of any software that was used during mail generation process, not only address processing software. For that matter, more generally the described methodology is equally useful when there is a need to ascertain that a certain piece of software was used in generating a certain document which bears evidence of such use. However, the detailed description given below deals only with the address processing software as the preferred embodiment for the most important function in the mail production process.

It has also been discovered that the verification process can be automated by keeping track of mail pieces form the given mailing during physical sortation process by the postal processing equipment such as multi line optical character recognition (MLOCR) sorterer. Alternatively, the verification process can be performed automatically by a Bulk Mail Acceptance Unit (BMAU). The BMAU is a machine used by the United States Postal Service to verify presort qualification by feeding onto a transport a sample of mail or entire mailing; reading addresses and keeping track of the number of mail pieces having certain postal codes. In this functionality, the BMAU is not different than MLOCR.

In addition, the method of present invention can be adopted for use with a special purpose computing system utilized to intercept print files on their way from data processing computer to a printer. Such is the case when main processing software residing for example on a mainframe computer is difficult to modify to extract certain information important for physical mail generation. One such computing system for intercepting and processing print stream is produced by the assignee of the present invention and is known as StreamWeaver®. These and other modifications (some presented below) are entirely within the spirit of present invention.

System Structure and Operation

Reference is now made to FIG. 1. A mail generation system 102 includes a data processing computer 104 having business application software which is employed to create a mailing. The data processing computer 104 may be connected to a second computer 106 adapted to run a software program for modifying an original print file to be an enhanced print file, which is sent to printer 108. One suitable software program for changing an original print file to an enhanced print file is the StreamWeaver® to provide print stream processing software marketed by Pitney Bowes Inc. The printer 108 generates a series of printed documents 110 which are further processed by an inserter system 112 having a control computer 114.

Three secure trusted accounting devices are provided in the system. A first secure trusted accounting device 116 is connected between the data processing computer 104 and the inserter control computer 114. A second secure trusted accounting device 118 is connected between the print enhanced file computer 106 and the control computer 114. A third secure trusted accounting device 120 is connected directly to the inserter control computer 114.

One form of secure trusted accounting device hardware is manufactured by Chrysalis-ITS and is known as the Luna Encryption and Digital Signature Token Device.

It should be recognized that the architecture and the number of secure trusted accounting devices is a matter of choice. The secure trusted accounting device 116 provides a statement of discounts based on the information supplied directly by the data processing computer 104. Similarly, the secure trusted accounting device 118 also provides a statement of discounts based directly on the information provided by the computer 106. This information, which is redundant, is supplied to the control computer 114. A selection may be made to use one or the other of the secure trusted accounting devices 116 and 118 unless there is unique information available only to one and not the other of the secure trusted accounting devices. Secure trusted accounting device 120 provides information concerning the operation of the physical preparation of the mail by the inserter system 112. It should be noted that the inserter system 112 merely by way of example and can be other equipment involved in the physical preparation and processing of the mail, such as mailing machines, sorters, fully integrated mail generation systems, which includes data processing, packaging, and any other system involved in the physical preparation and processing of the mail.

A statement of mailing, which includes the statement of discounts, is provided to a verification computer through a network connection.

Figure 2:
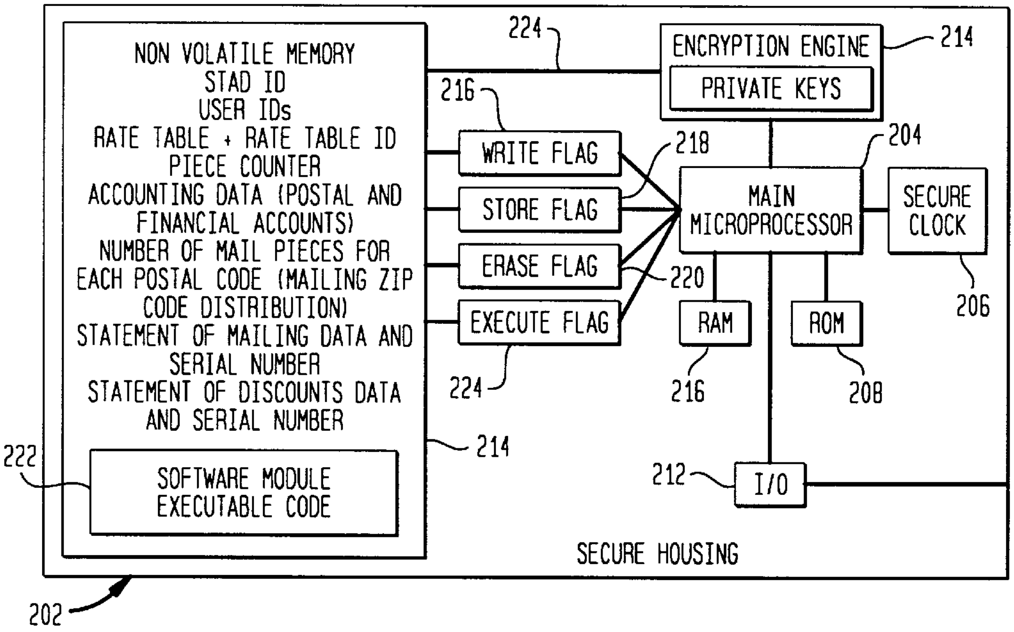
FIG. 2 is a secure trusted accounting device suitable for use in the system shown in FIG. 1.

Reference is now made to FIG. 2. The secure trusted accounting device 202 includes a main microprocessor 204 having a secure clock 206, a read-only memory (ROM) 208, random access memory (RAM) 210 and an input/output (I/O) connection 212.

An encryption engine 214 has private keys securely stored. A flagging system is provided for the computer so that information can be written into the non-volatile memory 214 and can be erased from the non-volatile memory 214, but cannot be modified once written into the non-volatile memory 214. The flagging system involves a write flag 216 to enable writing into the non-volatile memory when the store flag 218 is made active. An erase flag 220 is provided to erase information from the non-volatile memory.

The non-volatile memory 214 contains various information useful in processing the mail. This includes the secure trusted accounting device identification, the user identification, the rate table and rate table identification, a piece counter, accounting data and postal and financial accounts information, number of mail pieces for each postal code (mailing ZIP code distribution), statement of mailing data and serial number, and statement of discount data and serial number.

A software module is also provided with executable code at 222. This software module executable code is a software which is fetched by the main microprocessor to operate as a executable code for a software routine that resides outside of the secure trusted accounting device 202. This executable code is enabled when an execution execute flag 224 is made active.

It should be recognized that the secure trusted accounting device is housed within a secure tamper-proof housing which may leave telltale signs of attempts to comprise the physical security of the device and have other security features to provide device protection, such as secure connection between the encryption engine and the non-volatile memory shown at 224. Other secure forms of protection may also be employed.

Figure 3:
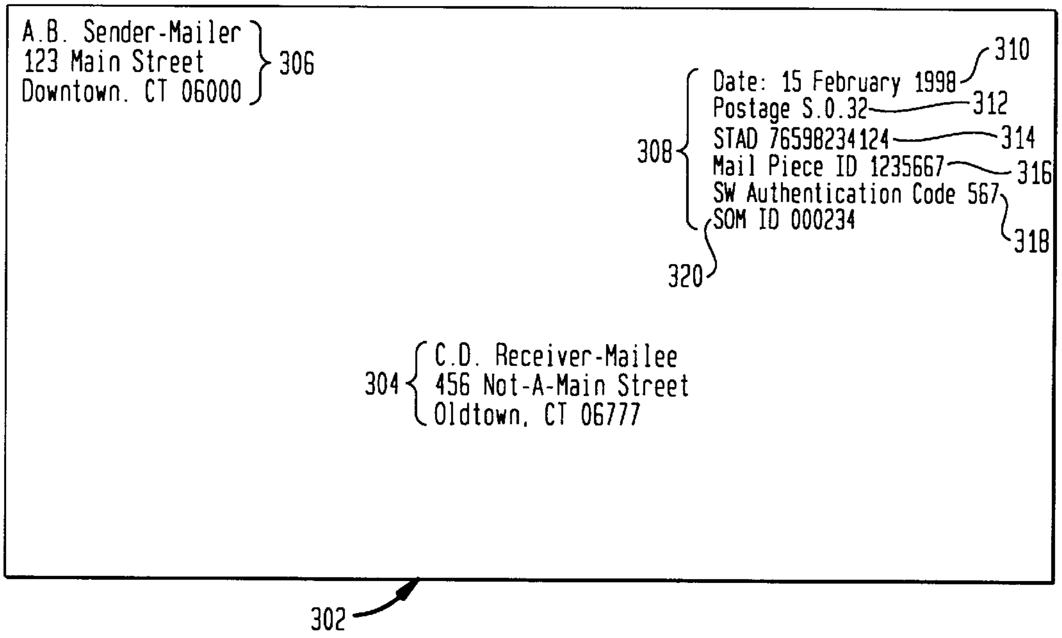
FIG. 3 is a mail piece created in accordance with aspects of the present invention.

Reference is now made to FIG. 3. A mailpiece 302 includes a destination address at 304 and a sender address at 306. Various information relevant to processing the mail is provided at 308. This includes the date of mailing at 310, the postage amount for the mailpiece at 312, the identification of the secure trusted accounting device which processed the mail at 314, and a mailpiece identification at 316.

A software authentication code is provided at 318. This is a digital token which provides evidence of the fact that the software module executable code 222 was utilized in the preparation and processing of the mail. Finally, a statement of mailing identification code is printed at 320. This ties the specific mailpiece to a specific piece of mailing document. The digital token may include as part of its input the statement of mailing identification number, which protects the integrity of the information on the mailpiece generally shown at 308.

It should be recognized that the organization of the printing of the information on the mailpiece is a matter of design choice and can be modified to meet various needs. It can be printed in barcode form to facilitate machine reading of the mailpiece and facilitate automated processing. Various additional information can be included on the mailpiece, depending on the nature of the information desired by the verification authority in processing the mail to provide the integrity desired.

Reference is now made to FIG. 4. A statement of mailing 402 includes various information relating to the mail created by the system shown in FIG. 1. The statement of mailing includes the name of the mailer at 404, the address and telephone number of the mailer at 406, the internal account number of the mailer at 408, the banking or financial account number of the mailer at 410, the statement of mailing serial number at 412, and the date that the statement of mailing was prepared at 414. Additional information i provided as to the name of the party on behalf whom the mailing has been prepared, if applicable, at 416 and the secure trusted accounting device identification at 418. The method of payment is set forth at 420 and the contract number associated with the type of mailing at 422. This could be, for example, the various contracts that mailers have with the postal services for delivery services related to different categories of mail. The container type, here shown as trays, is noted at 424 as well as the container weight at 426. The actual weight is shown at 428 as the weight of the cardboard tray in which the mail is stacked. Four different categories of mail are shown under the product description at 430. These include three/five digit presorted, pre-barcoded (that is, the mail is first sorted to three digit presort and, within each presort, further presorted to five digits.) at 434, residual at full rate at 436 with the totals being shown at 438. Within each product description, information is provided as to the weight per piece at 440, the rate at 442, the number of pieces at 444, and the combined weight at 446. The combined postage is shown at 448.

A statement of discounts with serial number is shown at 450. This serial number 452 may be the same as the statement of mailing serial number 412 or may be unique to the statement of discounts itself and related to the statement of mailing. At 454, further information as to the three digit zip code "068" is shown with 300 pieces. This breaks down as shown in the five digit zip sub-group 1, 2, through n, 456, 458 and 460 with the number of pieces in each five digit zip code sub-group. This information 454–460 is again repeated in area 462 for a different three digit zip code sub-group "061". The number of mailpieces pre-barcoded to eleven digits at 464, nine digits at 466, five digits at 468 and without barcodes at 470 is provided. The number of mailpieces in each of these various categories 464–470 is also shown. A digital signature for the statement of mailing is provided at

472 and the mailer's public key certificate is also shown at 474. Finally, the total number of pieces in the statement of discounts is provided at 476 as 660 pieces having a total weight at 478 of 630 ounces.

It should be expressly noted that this statement of mailing may be communicated electronically between the mailer and the carrier system or any trusted third party involved in the processing of the mail. Additionally, the statement of mailing may be printed for physical inclusion with the batch of mail being provided to the carrier service.

Figure 5:
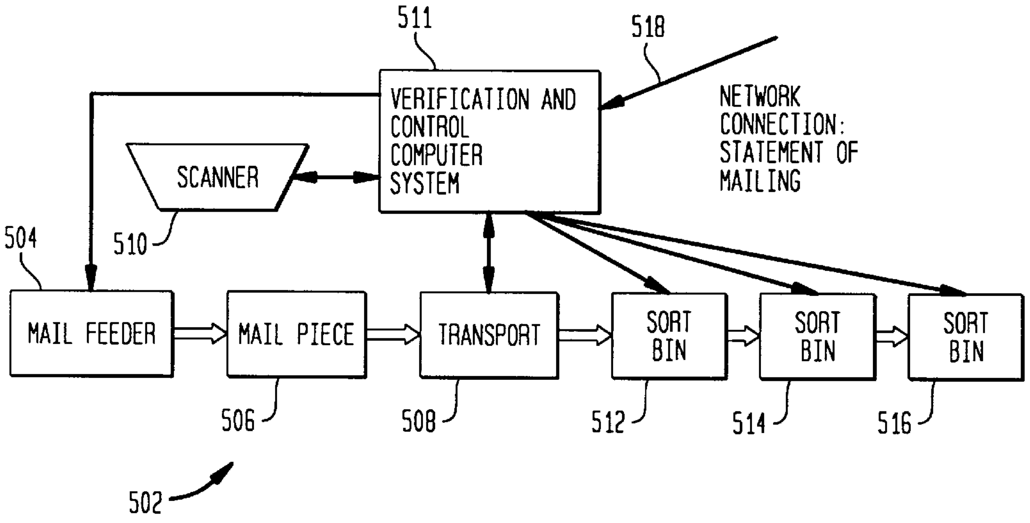
FIG. 5 is a verification system for mail pieces created by the system shown in FIG. 1.

Reference is now made to FIG. 5. A mail verification system 502 includes a mixed mail feeder 504, which feeds various mailpieces 506 to a transport 508. A scanner 510 scans the mailpieces as they are transported by transport 508. The transport 508 feeds the mailpieces under the control of the verification and control computer system 511 into a plurality of sort bins 512, 514 and 516. The sortation is based on information obtained via scanning at 510, which information is provided to the verification and control computer 511.

The statement of mailing is provided via the network connection 518 to the verification and control computer system 511. By obtaining the statement of mailing, the verification and control computer system compares the information obtained by the electronic copy of the statement of mailing with the information obtained from scanning the physical mailpieces. This allows verification that the mailing is consistent with the statement of mailing. Alternatively, if it is not consistent, a suitable investigation can be implemented.

Figure 6:
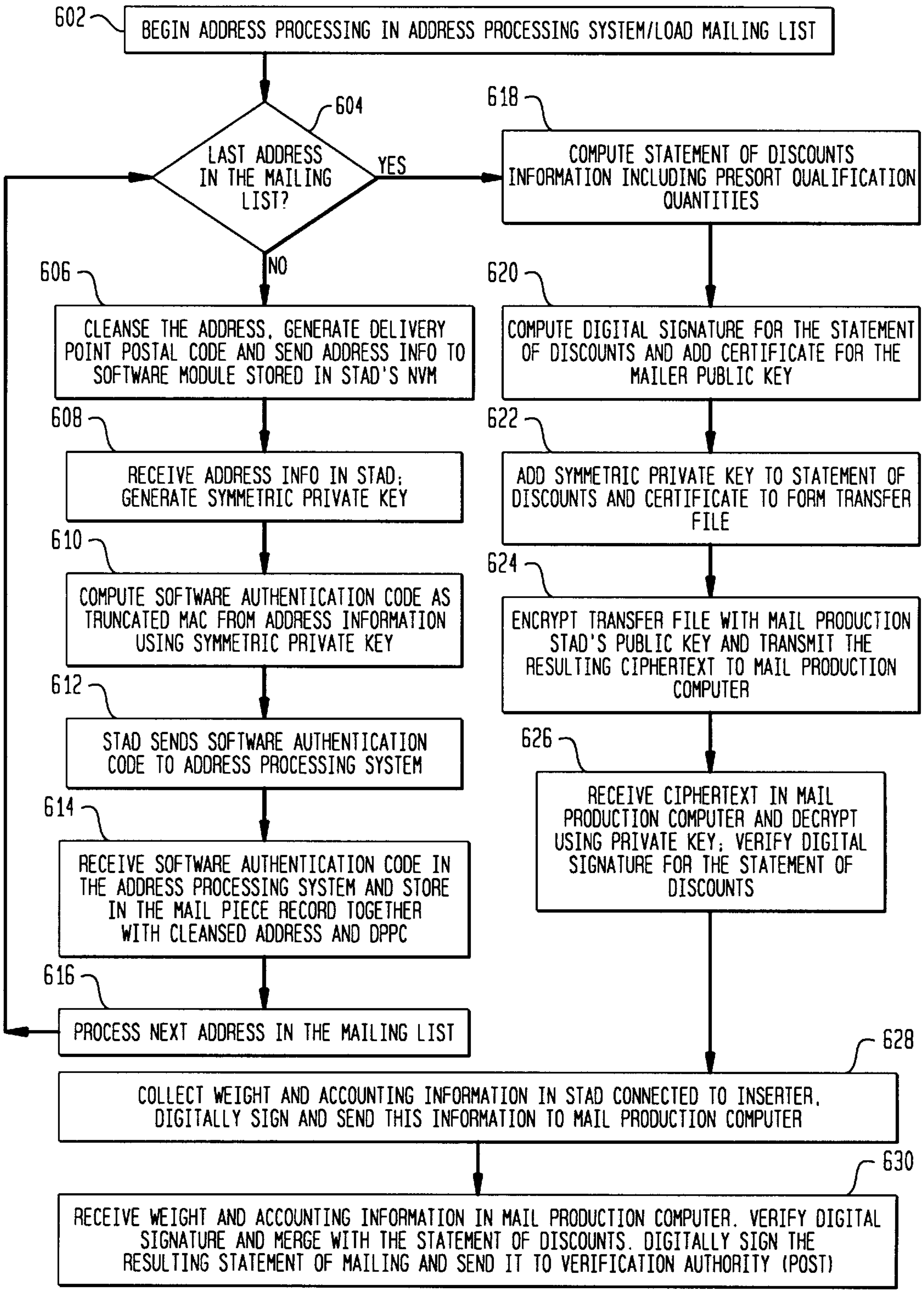
FIG. 6 is a flow chart for the process of generation of secured statement of mailing including statement of discounts.

Reference is now made to FIG. 6. A mailing list is loaded into the system at 602 to begin processing of the information necessary to generate the mailing. A determination is made at 604 whether the address is the last address in the mailing list. If it is not, the mail processing process continues with the address cleansing and generation of delivery bar code postal code at 606. At 606, additionally, the address information is sent to the software module stored in the secure trusted accounting device's non-volatile memory. Address information in the secure trusted accounting device is received and a symmetric private key is generated at 608. A software authentication code is computed at 610. This code may be a truncated message authentication code (MAC) from address information using symmetric private keys. The secure trusted accounting device sends the software authentication code to the address processing system at 612 and the software authentication code is received in the address processing system at 614. This is stored in the mailpiece record together with the cleansed address and delivery point postal code. At this point, the next address in the mailing list is processed at 616.

When the last address in the mailing list is reached, the statements of discounts is computed at 618, including a presort qualification quantities. This computation is performed in the secure trusted accounting device. A digital signature for the statement of discounts is computed and a certificate for the mailer's public key added at 620. Thereafter, the symmetric private key is added to the statement of discounts and certificate to form a transfer file at 622. The transfer file is encrypted with the mail production secure trusted accounting device's public key and the resulting cipher text is transmitted to the mail production computer at 624.

The cipher text is received in the mail production computer and decrypted using the private key at 626. At this point, the digital signature of the statement of discounts is verified. The weight and accounting information in the secure trusted accounting device is collected and connected to an inserter or other mail processing equipment and digitally signed and transmitted to the mail production computer at 628. At 630, the weight and accounting information is received in the mail production computer and the digital signature is verified. The statement of discounts is merged. The resulting statement of mailing is digitally signed and transmitted to the verification authority, such as a postal authority.

Figure 7:
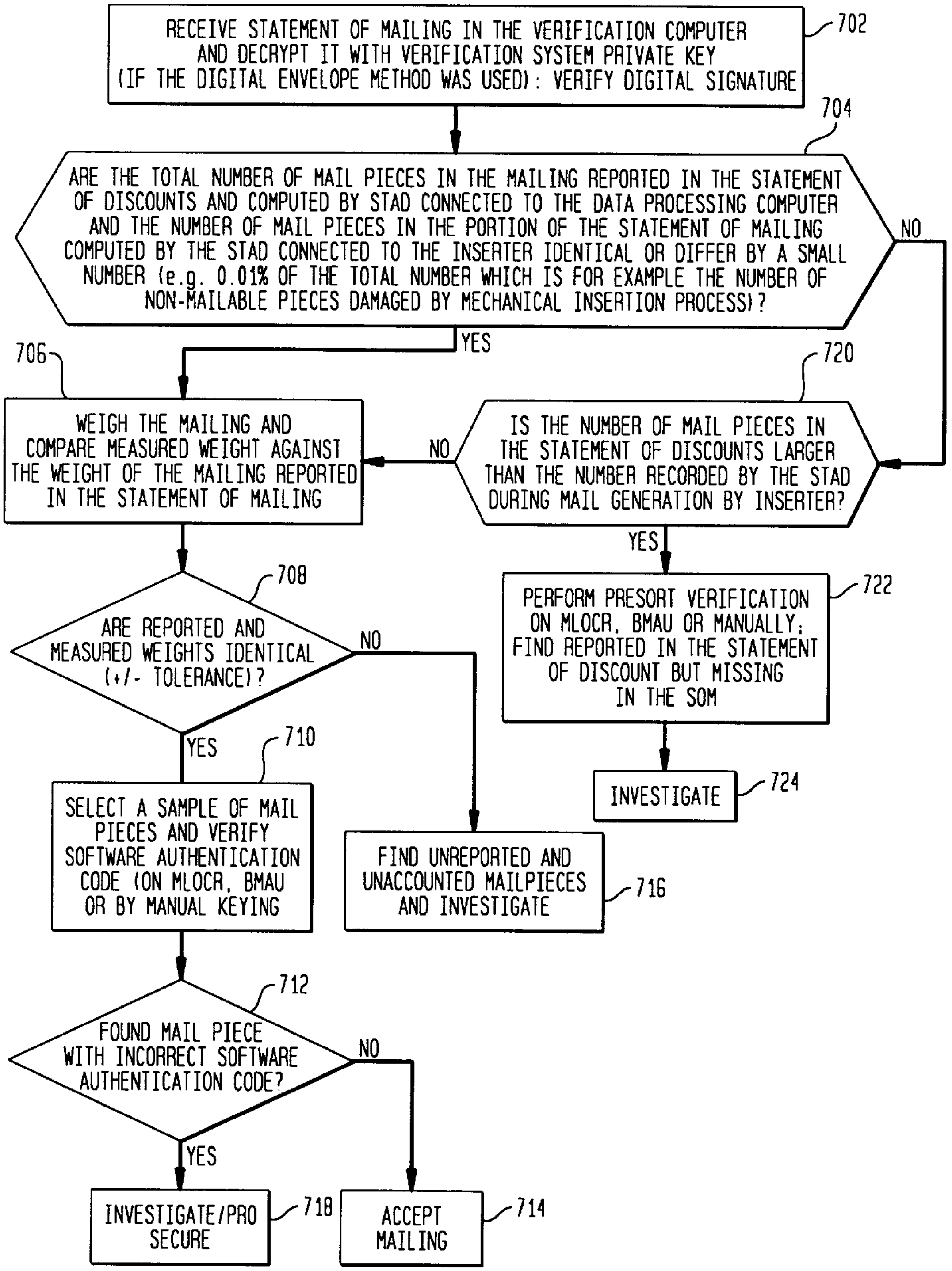
FIG. 7 is a flow chart for the process of verification of the secure statement of mailing including statement of discounts.

Reference is now made to FIG. 7. The statement of mailing is received at the verification computer at 702 and is decrypted with its verification system private key. The digital signature is then verified. Alternatively, the statement of mailing can be decrypted and verified using the public key certificate appended to the statement of mailing.

At 704, consistency is determined between the secure trusted accounting devices connected to the data processing computer and the inserter. If they are identical or differ by a small number (any number acceptable to the postal authorities), the process may proceed. Where the consistency is acceptable, the measured weight is compared with the weight reported in the statement of mailing at 706. A determination is made at 708 whether the measured and reported weights are identical or within tolerances. If they are within tolerances, a sample of the mailpieces are selected at 710 and the software authentication code is verified. This may be on a MLOCR or BMAU or by manual keying, as determined by the verification facility. A determination is made at 712 whether the mailpieces have a correct or incorrect authentication code. If the mail has the correct authentication code, the mail is accepted at 714 for entry into the mail processing stream. If a determination was made at 708 or 712 that the weights were not within tolerances or the authentication code was incorrect, an investigation is initiated at 716 and/or 718, as the case may be.

Where at 704 an inconsistency is found between the various secure trusted accounting devices, a determination is made at 720 if the number of mailpieces in the statement of discounts is larger than the number recorded by the secure trusted accounting device during the mail generation by the inserter. If this is not the case, the process continues at 706, as previously described.

If, however, the number of mailpieces in the statement of discounts is larger than the number recorded by the secure trusted accounting device during the mail generation by the inserter, presort and verification is performed at 722 by the MLOCR, BMAU or manually, as desired. In such a case, a determination is made to find the missing mailpieces which have been reported in the statement of discounts but are missing in the statement of mailing. As appropriate, an investigation is initiated at 724. This may develop potential evidence of fraud on the part of an unscrupulous mailer.

While the present invention has been disclosed and described with reference to the disclosed embodiments thereof, it will be apparent, as noted above, that variations and modifications may be made.

What is claimed:

1. A mail generation system comprising:

means for processing data to generate mail piece information;

first secure processing means for securely storing and encrypting mail piece information generated by said processing means;

means coupled to said data processing means for physically preparing mail pieces related to said generated mail piece information and for generating information related to the physical preparation of said mail;

second secure processing means for securely storing and encrypting information generated by said mail preparing means;

means for sorting said mail pieces and for generating information related to said sorting and packaging of said mail pieces; and, third secure processing means for securely storing and encrypting information generated by said mail sorting and packaging means.

2. A method for mail generation comprising the steps of:

processing data to generate mail piece information;

securely storing and encrypting mail piece information generated by said data processing;

physically preparing mail pieces related to said generated mail piece information and generating information related to the physical preparation of said mail;

securely storing and encrypting information generated by said mail preparing;

generating information related to said sorting and packaging of said mail pieces; and, securely storing and encrypting information generated by said mail sorting and packaging.

3. A mail generation system comprising:

means for processing data to generate mail piece information;

secure processing means for securely storing and encrypting mail piece information generated by said processing means;

means coupled to said data processing means for physically preparing mail pieces related to said generated mail piece information and for generating information related to the physical preparation of said mail; and, second secure processing means for securely storing and encrypting information generated by said mail preparing means.

4. A mail generation system as defined in claim 3 wherein said mail piece information which is stored and encrypted relates to information upon which postal processing charges are computed.

5. A method for mail generation comprising the steps of:

processing data to generate mail piece information;

securely storing a part of the software program used to generate said mail piece information;

encrypting mail piece information to verify that said software program was employed to generate said mail piece information; and, physically preparing mail pieces related to said generated mail piece information.

6. A method for mail generation comprising the steps of:

processing data to generate mail piece information;

securely storing and encrypting mail piece information generated by said data processing;

physically preparing mail pieces related to said generated mail piece information and generating information related to the physical preparation of said mail;

securely storing and encrypting information generated by said mail preparing;

comparing said securely stored and encrypted mail piece information generated by said data processing and said securely stored and encrypted information generated by said mail preparing means.

7. A method for mail generation as defined in claim 6 comprising the further step of physically inspecting said mail.

8. A method for mail generation as defined in claim 6 comprising the further step of physically inspecting said mail for consistency with said securely stored and encrypted mail piece information generated by said data processing and said securely stored and encrypted information generated by said mail preparing means.

* * * * *